(12) United States Patent
Sun et al.

(10) Patent No.: US 11,091,640 B2
(45) Date of Patent: Aug. 17, 2021

(54) FILLING COMPOSITION FOR OPTICAL FIBER CABLES

(71) Applicant: Dow Global Technologies LLC, Midland, MI (US)

(72) Inventors: Gangwei Sun, Shanghai (CN); Peng Gao, Shanghai (CN); Yonghua Gong, Shanghai (CN); Mohamed Esseghir, Lawrenceville, NJ (US)

(*) Notice: Subject to any disclaimer, the term of this patent is extended or adjusted under 35 U.S.C. 154(b) by 108 days.

(21) Appl. No.: 16/624,543

(22) PCT Filed: Jun. 30, 2017

(86) PCT No.: PCT/CN2017/090994
§ 371 (c)(1),
(2) Date: Dec. 19, 2019

(87) PCT Pub. No.: WO2019/000361
PCT Pub. Date: Jan. 3, 2019

(65) Prior Publication Data
US 2021/0155801 A1    May 27, 2021

(51) Int. Cl.
*C08L 91/00* (2006.01)
*G02B 6/44* (2006.01)

(52) U.S. Cl.
CPC ............ *C08L 91/00* (2013.01); *G02B 6/4429* (2013.01); *G02B 6/4494* (2013.01)

(58) Field of Classification Search
CPC ..... C08L 91/00; G02B 6/4429; G02B 6/4494; G02B 6/441
See application file for complete search history.

(56) References Cited

U.S. PATENT DOCUMENTS

| | | | |
|---|---|---|---|
| 4,190,570 A | 2/1980 | Kaufman et al. | |
| 5,187,763 A | 2/1993 | Tu | |
| 5,737,469 A | 4/1998 | Costello et al. | |
| 5,783,638 A | 7/1998 | Lai et al. | |
| 6,160,939 A | 12/2000 | Sheu | |
| 6,333,374 B1 | 12/2001 | Chen | |
| 8,045,833 B2 | 10/2011 | Wasserman et al. | |

FOREIGN PATENT DOCUMENTS

| | | |
|---|---|---|
| CN | 1181511 | 5/1998 |
| CN | 1699238 | 11/2005 |
| CN | 101876735 | 11/2010 |
| CN | 104181655 | 12/2014 |

OTHER PUBLICATIONS

Williams, T., et. al., "The Construction of a Polyethylene Calibration Curve for Gel Permeation Chromatography Using Polystyrene Fractions," Polymer Letters, 1968, p. 621-624, vol. 6.
PCT Search Report from PCT counterpart Application No. PCT/CN2017/090994.

*Primary Examiner* — Robert S Jones, Jr.

(57) ABSTRACT

A composition comprises (A) a mineral oil having a viscosity from 32 cSt to 100 cSt at 40° C.; (B) a styrene-ethylene/propylene diblock copolymer; and (C) from 1 wt % to less than 5 wt % polystyrene having a weight average molecular weight ($M_w$) from 1,000 to 100,000. The composition is used as a filling composition in a buffer tube.

10 Claims, 1 Drawing Sheet

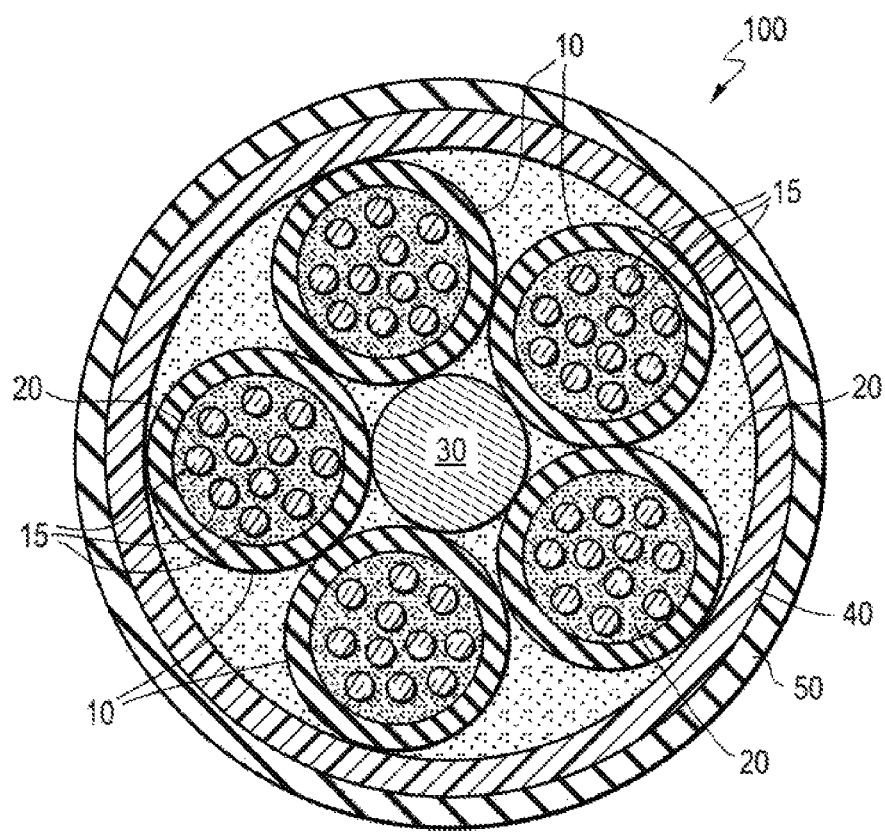

FILLING COMPOSITION FOR OPTICAL FIBER CABLES

FIELD

This disclosure relates to optical fiber cables. In one aspect, the disclosure relates to filling compositions for optical fiber cables, while in another aspect, the disclosure relates to optical fiber cables including the same.

BACKGROUND

Optical fiber cables include one or more optical fibers or other optical waveguides that conduct optical signals (e.g., for carrying sound, data, video or other information). Generally, the optical fibers are arranged in a tubular assembly called a buffer tube. To protect the optical fibers from damage (e.g., exposure to humidity/moisture, physical stress), the buffer tube is filled with a filling composition which surrounds the optical fibers. The filling composition acts as a moisture barrier to prevent water from damaging the optical fibers and a cushion to absorb mechanical shock. The filing composition can be a fluid, a gel, a grease or a thixotropic material.

Filling compositions are commonly based on a composition composed of styrenic block copolymer and a large proportion of a hydrocarbon oil (e.g., mineral oil). Such a filling composition is a fluid which flows easily around the optical fibers to completely fill the buffer tube and can be readily pumped into the buffer tube during manufacture of an optical fiber cable. One drawback of such a fluid filling composition, however, is that when the optical fiber cables are cut, the filling composition flows from the cut end which can make installation of the optical fiber cables difficult. Dry gels are easier for operators to work with, in that a cut optical fiber cable having a dry gel for a filling composition does not drip or flow when the optical fiber cable is cut. However, dry gels are difficult to pump and do not flow as readily as a fluid.

Consequently, the art recognizes the need for a filling composition which flows (i.e., can be pumped) and reduces or avoids the difficulties associated with oil leakage and cleanup.

SUMMARY

The present disclosure provides a filling composition comprising (A) a mineral oil having a kinematic viscosity from 32 cSt to 100 cSt at 40° C.; (B) a styrene-ethylene/propylene diblock copolymer; and (C) from 1 wt % to less than 5 wt % a polystyrene having a weight average molecular weight ($M_w$) from 1,000 to 100,000.

In another embodiment, the present disclosure provides a buffer tube comprising a filling composition in contact with a surface of the buffer tube, the filling composition comprising (A) a mineral oil having a kinematic viscosity from 32 cSt to 100 cSt at 40° C.; (B) a styrene-ethylene/propylene diblock copolymer; and (C) from 1 wt % to less than 5 wt % a polystyrene having a weight average molecular weight ($M_w$) from 2,000 to 100,000.

BRIEF DESCRIPTION OF THE DRAWINGS

FIG. 1 is a cross-sectional view of an optical fiber cable.

DEFINITIONS AND TEST METHODS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.). Unless stated to the contrary, implicit from the context, or customary in the art, all parts and percents are based on weight and all test methods are current as of the filing date of this disclosure.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations. Blends are not laminates, but one or more layers of a laminate may contain a blend.

"Cable" and like terms refer to at least one optical fiber within a protective insulation, jacket or sheath. Typically, a cable is two or more optical fibers bound together, typically in a common protective insulation, jacket or sheath. The individual fibers inside the jacket may be bare, covered or insulated.

"Composition," as used herein, includes a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed. The term "or," unless stated otherwise, refers to the listed members individual as well as in any combination. Use of the singular includes use of the plural and vice versa.

Density is measured in accordance with ASTM D1525.

"Direct Contact" means a configuration whereby a surface is immediately adjacent to a filling composition and no intervening layers or no intervening structures are present between the surface and the filling composition.

The drop point is an indication of the maximum temperature to which a filling compound can be exposed to without complete liquefaction or excessive oil separation. The drop point is determined using a ShenKai Drop Point Tester and is reported in ° C. The upper cork of the ShenKai Drop Point Tester is positioned so that the tip of the first thermometer bulb is about 3 mm above the bottom of the cup when the apparatus is assembled for test. The second thermometer is suspended in the oil bath so that its bulb is at approximately the same level as the bulb of the first thermometer. The cup is filled by presenting its larger opening into the filling composition until the cup is filled. The cup is held in a vertical position with its smaller opening at the bottom while it is gently pressed down over the metal rod until the rod protrudes about 25 mm above the larger opening. The rod is pressed against the cup in such a manner that the rod makes contact with both the upper and lower peripheries of the cup. This contact is maintained while the cup is rotated around its axis and is simultaneously moved down the rod until the cup passes over the lower end of the rod. This spiral-like motion will cause the filling composition to adhere along the rod leaving a conical void of compound in the cup and a coating having reproducible geometry on the inside of the cup. The cup and thermometer are placed in the test tube and the test tube is suspended in the oil bath. The oil bath is stirred and heated at a rate of 4° C./min to 7° C./min until the bath reaches a temperature approximately 17° C. below the expected drop point of the filling composition. Heating is continued at a rate such that the difference between the temperature in the test tube and the temperature in the oil bath is maintained between 1-2° C. This condition is established when the oil bath is heated at a rate of about 1° C./min to 1.5° C./min. As the temperature increases, the filling composition will gradually protrude through the orifice of the cup. The temperature at which the first drop of material falls is the drop point.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Non-limiting examples of ethylene-based polymer (polyethylene) include low density polyethylene (LDPE) and linear polyethylene. Non-limiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

An "ethylene-based polyolefin material" is a material that contains more than 50 weight percent of an ethylene-based polymer (based on the total weight of the material). Ethylene-based polyolefin materials include pure polyethylene as well as blends of ethylene-based polymers with other polyolefin polymers.

"Olefin polymer," "olefinic polymer," "olefinic interpolymer," "polyolefin" and like terms refer to a polymer derived from simple olefins. Representative polyolefins include polyethylene, polypropylene, polybutene, polyisoprene and their various interpolymers.

An "optical fiber" is a flexible, transparent fiber made by drawing glass or plastic to a diameter of several hundred microns or less. Typical optical fiber has a diameter from 230 micrometers (μm) to 270 μm, or 250 μm. The diameter of the optical fiber may or may not include a cladding and/or a coating surrounding the optical fiber. Optical fiber is used most often as a way to transmit light between the two ends of the fiber. Optical fiber finds wide usage in fiber-optic communications, where it enables transmission over distances and at data rates greater than wire cables.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer and propylene copolymer (meaning units derived from propylene and one or more comonomers). The terms "propylene-based polymer" and "polypropylene" may be used interchangeably.

A "propylene-based polyolefin material" is a material that contains more than 50 weight percent of a propylene-based polymer (based on the total weight of the material). Ethylene-based polyolefin materials include pure polypropylene as well as blends of propylene-based polymers with other polyolefin polymers.

"Interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

Melt flow rate (MFR) is measured in accordance with ASTM D1238, Condition 230° C./2.16 kilogram (kg) weight and reported in grams per 10 minutes (g/10 min).

Melt index (MI) is measured in accordance with ASTM D1238 at 190° C., 2.16 kg and reported in grams per 10 minutes (g/10 min).

Melt temperature, or "$T_m$," as used herein (also referred to as a melting peak in reference to the shape of the plotted DSC curve) is typically measured by the DSC (Differential Scanning Calorimetry) technique for measuring the melting points or peaks of polyolefins, as described in U.S. Pat. No. 5,783,638. It should be noted that many blends comprising two or more polyolefins will have more than one melting point or peak, many individual polyolefins will comprise only one melting point or peak.

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by T. Williams & I. M. Ward, *The Construction of a Polyethylene Calibration Curve for Gel Permeation Chro-*

*matography Using Polystyrene Fractions*, 6 J. Polymer Sci. Pt. B: Polymer Letter 621, 621-624 (1968)) to derive the following equation:

$$M_{polyethylene} = a \times (M_{polystyrene})^b$$

In this equation, a=0.4316 and b=1.0.

Number average molecular weight, $M_n$, of a polymer is expressed as the first moment of a plot of the number of molecules in each molecular weight range against the molecular weight. In effect, this is the total molecular weight of all molecules divided by the number of molecules and is calculated in the usual matter according to the following formula:

$$M_n = \sum n_i \times M_i \Big/ \sum n_I = \sum w_i \Big/ \sum (w_i / M_i)$$

where
$n_i$=number of molecules with molecular weight $M_i$
$w_i$=weight fraction of material having molecular weight $M_i$
and $\Sigma n_i$=total number of molecules.

Weight average molecular weight, $M_w$, is calculated in the usual manner according to the following formula: $M_w = \Sigma w_i \times M_i$, where $w_i$ and $M_i$ are the weight fraction and molecular weight, respectively, of the $i^{th}$ fraction eluting from the GPC column.

The ratio of these two averages, the molecular weight distribution (MWD or $M_w/M_n$), defines the breadth of the molecular weight distribution.

The "Z average molecular weight" (Mz) is the third moment average molar mass and calculated according to the following equation: Z average molecular weight was calculated according to the following equation:

$$M_z = \frac{\sum_i^i (Wf_i * M_i) M_i}{\sum_i (Wf_i) M_i}$$

where $M_i$ is the molecular weight at a slice of i (elution component i), and $Wf_i$ is the weight fraction of the polymer chains having a molecular weight of $M_i$.

"Polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as previously defined. Trace amounts of impurities, for example, catalyst residues, may be incorporated into and/or within the polymer.

"Olefin polymer," "olefinic polymer," "olefinic interpolymer," "polyolefin" and like terms refer to a polymer derived from simple olefins. Representative polyolefins include polyethylene, polypropylene, polybutene, polyisoprene and their various interpolymers. "Alpha-olefin," "α-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 3 carbon atoms, preferably of 3 to 20 carbon atoms, in some cases preferably of 4 to 10 carbon atoms and in other cases preferably of 4 to 8 carbon atoms. Nonlimiting examples of α-olefins from which the elastomers are prepared include ethylene, propylene, 1-butene, 1-pentene, 1-hexene, 1-octene, 1-dodecene, and mixtures of two or more of these monomers.

The shear rate is the rate of change of velocity at which one layer of a fluid passes over an adjacent layer. Shear rate is a gradient velocity and depends on flow velocity and radius of the tube/vessel. For fluid flows between two parallel plates, one moving at a constant speed and the other one stationary (Couette flow), the shear rate is calculated by $\dot{\gamma}$=v/h, wherein $\dot{\gamma}$ is the shear rate, measured in reciprocal seconds, v is the velocity of the moving plate, measured in meters per second (m/sec), and h is the distance between the two parallel plates, measured in meters (m). Shear rate is reported in inverse seconds ($s^{-1}$).

The shear thinning index is the ratio of shear viscosities at a low shear rate (e.g., 0.1 $s^{-1}$ to 10 $s^{-1}$) and a high shear rate (e.g., greater than or equal to 100 $sec^{-1}$). The shear thinning index is measured in a steady state shear mode by a rotational rheometer AR2000EX, TA instruments with a 20 mm, 2 degree steel cone plate. The testing temperature is set at 25° C. and the shear rates ranged from 1 $s^{-1}$ to 201 $s^{-1}$. The shear thinning index is calculated using the shear viscosity at 6 $s^{-1}$ and the shear viscosity at 201 $s^{-1}$.

Shear viscosity (or dynamic viscosity) is a fluid's resistance to shearing flows and is reported in Pa·s (pascal seconds), mPa·s (millipascal seconds) or MPa·s (megapascal seconds). Shear viscosity is calculated by $\eta = \tau/\dot{\gamma}$ wherein $\eta$ is the shear viscosity measured in Pascal·seconds, $\tau$ is the shear stress measured in Pascal, and $\dot{\gamma}$ is the shear rate, measured in reciprocal seconds. For purposes of this specification, shear viscosity is measured using an AR2000EX rotational rheometer, TA instruments with a 20 mm, 2 degrees steel cone plate. The testing temperature is set at 25° C. and the shear rates ranged from 1 $s^{-1}$ to 200 $s^{-1}$.

Low shear rate viscosity means the shear viscosity measured at a shear rate of 5 $s^{-1}$.

Medium shear rate viscosity means the shear viscosity measured at a shear rate of 50 $s^{-1}$.

High shear rate viscosity means the shear viscosity measured at a shear rate of 200 $s^{-1}$.

Kinematic viscosity is the ratio of the shear viscosity to the density of a fluid and is reported in St (stokes) or cSt (centistokes). For purposes of this specification, kinematic viscosity is measured at 40° C. using a Brookfield viscometer in accordance with ASTM D 445.

DETAILED DESCRIPTION

The present disclosure provides a filling composition comprising (A) a mineral oil having a kinematic viscosity from 32 cSt to 100 cSt at 40° C.; (B) a styrene-ethylene/propylene diblock copolymer; and (C) from 1 wt % to less than 5 wt % polystyrene having a weight average molecular weight ($M_w$) from 1,000 to 100,000.

(A) Mineral Oil

The filling composition comprises a mineral oil having a kinematic viscosity from 32 cSt to 100 cSt.

In an embodiment, the mineral oil is free of fillers and rheology modifiers, such as thickeners.

A non-limiting example of a suitable commercially-available mineral oil includes 400N mineral oil available from Suzhou SAIPAHAN Special Oil Co. Ltd.

In an embodiment, the mineral oil is present in the composition in an amount of from 70 weight percent (wt %), or 75 wt %, or 80 wt % to 85 wt %, or 87 wt %, or 88 wt %, or 89 wt %, or 90 wt % based on the total weight of the filling composition.

(B) Styrene-Ethylene/Propylene Diblock Copolymer

The filling composition comprises a styrene-ethylene/propylene diblock copolymer.

The styrene-ethylene/propylene diblock copolymer has a bound styrene content from 25%, or 30%, or 35% to 40%, or 45% by mass.

The styrene-ethylene/propylene diblock copolymer has a density from 0.890 g/cc, or 0.895 g/cc, or 0.900 g/cc, or 0.905 g/cc to 0.910 g/cc, or 0.915 g/cc, or 0.920 g/cc.

In an embodiment, the styrene-ethylene/propylene diblock copolymer is present in the filling composition to the exclusion of triblock polymers and styrenic tribock polymers in particular.

A non-limiting example of a suitable commercially-available styrene-ethylene/propylene diblock copolymer is G1701, a clear linear diblock copolymer based on styrene and ethylene/propylene, with a bound styrene content of 35% mass, available from Kraton Company.

In an embodiment, the styrene-ethylene/propylene diblock copolymer is a mixture of two or more styrene-ethylene/propylene diblock copolymers as described herein.

In an embodiment, the styrene-ethylene/propylene diblock copolymer or mixture of two or more styrene-ethylene/propylene diblock copolymers is present in the composition in an amount of from greater than 5 wt %, or 5.5 wt %, or 6 wt %, or 6.5 wt %, or 7 wt %, to 7.5 wt %, or 8 wt %, or 8.5 wt %, or 9 wt % based on the total weight of the filling composition.

(C) Polystrene

The filing composition comprises from 1 wt % to less than 5 wt % polystyrene having a weight average molecular weight ($M_w$) from 1,000 to 100,000.

A polystyrene is a clear, color-stable, low molecular weight thermoplastic hydrocarbon polymer based on purified 8-9 carbon aromatic monomers that contains more than 50 wt % polymerized styrene monomer (based on the total amount of polymerizable monomers) and, optionally, may contain at least one comonomer.

In an embodiment the polystyrene has a $M_w$ from 1,000, or 2,000, or 5,000, or 10,000, or 15,000, or 20,000, or 25,000 to 30,000, or 35,000, or 40,000, or 50,000, or 75,000, or 100.000.

The polystyrene has a $M_n$ from 1000, or 1100, or 1200, or 1300, or 1400, or 1500, or 1600 to 1700, or 1800, or 1900, or 2000, or 2100, or 2100, or 2200, or 2300, or 2400, or 2500, or 2600, or 3000.

The polystyrene has a molecular weight distribution ($M_w/M_n$) from 1.0, or 2.0, or 3.0, or 5.0, or 10.0 to 15.0, or 20.0, or 25.0, or 30.0.

The polystyrene has a Mz from 1,000, or 5,000, or 100,000, or 15,000, or 20,000, or 25.000 to 30,000, or 35,000, or 40,000, or 45,000, or 50,000, or 75,000, or 100,000.

The polystyrene has a density from 1.00 g/cc, or 1.01 g/cc, or 1.02 g/cc, or 1.03 g/cc to 1.04 g/cc, or 1.05 g/cc, or 1.06 g/cc, or 1.07 g/cc, or 1.08 g/cc, or 1.09 g/cc, or 1.10 g/cc.

The polystyrene has a styrene content from greater than or equal to 95 wt %, or 96 wt %, or 97 wt %, or 98 wt %, or 99 wt %, or 99.9 wt %, or 99.99 wt % to 100 wt %, based on the total weight of the polystyrene.

In an embodiment, the polystyrene has a $M_w$ from 1,000, or 2,000, or 5,000, or 10,000, or 15,000, or 20,000, or 25,000 to 30,000, or 35,000, or 40,000, or 50,000, or 75,000, or 100.000 and are same, or all of the properties:

i) a $M_n$ from 1000, or 1100, or 1200, or 1300, or 1400, or 1500, or 1600 to 1700, or 1800, or 1900, or 2000, or 2100, or 2100, or 2200, or 2300, or 2400, or 2500, or 2600, or 3000; and/or ii) a $M_w/M_n$ from 1.0, or 2.0, or 3.0, or 5.0, or 10.0 to 15.0, or 20.0, or 25.0, or 30.0; and/or iii) a Mz from 1,000, or 5,000, or 100,000, or 15,000, or 20,000, or 25,000 to 30,000, or 35,000, or 40,000, or 45,000, or 50,000, or 75,000, or 100,000; and/or iv) a styrene content from greater than or equal to 95 wt %, or 96 wt %, or 97 wt %, or 98 wt %, or 99 wt %, or 99.9 wt %, or 99.99 wt % to 100 wt %, based on the total weight of the polystyrene; and/or v) a density of 1.00 g/cc, or 1.01 g/cc, or 1.02 g/cc, or 1.03 g/cc to 1.04 g/cc, or 1.05 g/cc, or 1.05 g/cc, or 1.07 g/cc, or 1.08 g/cc, or 1.09 g/cc, or 1.10 g/cc.

In an embodiment, the polystyrene has a $M_w$ from 1,000, or 2,000, or 5,000, or 10,000, or 15,000, or 20,000, or 25,000 to 30,000, or 35,000, or 40,000, or 50,000, or 75,000, or 100.000 and at least two, at least three, or all four of the properties i)-v).

Non-limiting examples of suitable commercially-available polystyrene include Kristalex F115 available from Eastman Chemical, Endex 150 available from Eastman Chemical and Piccolastic D125 available from Eastman Chemical.

In an embodiment, the polystyrene may be a mixture of two or more polystyrenes as disclosed herein.

In an embodiment, the polystyrene or mixture of two or more polystyrenes is present in an amount from 1.0 wt, or 1.5 wt %, or 2.0 wt %, or 2.5 wt % to 3.0 wt %, or 3.5 wt %, or 4.0 wt %, or 4.5 wt %, or less than 5.0 wt % based on the total weight of the filling composition.

(D) Polyolefin Copolymer

The filling composition optionally comprises a polyolefin copolymer having a weight average molecular weight ($M_w$) from 5,000, or 7,500, or 10,000, or 15,000 to 20,000, or 25,000, or 30,000.

The polyolefin copolymer comprises units derived from two or more alpha-olefins.

In an embodiment, the polyolefin is an ethylene-based copolymer. The ethylene-based copolymer comprises units derived from ethylene and units derived from one or more alpha-olefin comonomers. Non-limiting examples of suitable alpha-olefin comonomers include propylene, 1-butene, and 1-octene. In an embodiment, the ethylene-based copolymer is an ethylene/propylene copolymer.

In an embodiment, the polyolefin copolymer is a propylene-based copolymer comprising units derived from propylene and units derived from one or more alpha-olefin comonomers. Non-limiting examples of suitable alpha-olefin comonomers include ethylene, 1-butene, and 1-octene. In an embodiment, the propylene-based copolymer is a propylene/ethylene copolymer.

In an embodiment, the polyolefin copolymer is a propylene/ethylene copolymer and has one, some or all of the properties:

i) a number average molecular weight ($M_n$) from 5,000, or 10,000, or 20,000, or 50,000 to 60,000, or 75,000, or 100,000; and/or ii) a density from 0.850 g/cc, or 0.855 g/cc, or 0.860 g/cc, or 0.965 g/cc to 0.870 g/cc, or 0.875 g/cc, or 0.880 g/cc, or 0.885 g/cc, or 0.890 g/cc, or 0.895 g/cc, or 0.900 g/cc.

In an embodiment, the polyolefin copolymer is a mixture of two or more polyolefin copolymers as described herein.

If present, the polyolefin copolymer or mixture of two or more polyolefin copolymers is present in the composition in an amount of from 1 wt %, or 2 wt %, or 3 wt %, or 5 wt % to 6 wt %, or 7 wt %, or 8 wt %, or 90 wt %, or 10 wt % based on the total weight of the filling composition.

(E) Antioxidant.

The filling composition optionally includes an antioxidant.

""Antioxidant" refers to types or classes of chemical compounds that are capable of being used to minimize the oxidation that can occur during the processing of polymers.

Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate], Non-limiting examples of suitable antioxidants include tris(2,4-ditert-butylphenyl)phosphite, available as IRGAFOS® 168 from Ciba, and tetrakis [methylene (3,5-di-tert-butyl-4-hydroxyhydrocinnamate)] methane, available as Antioxidant 1010 from Akrochem Corporation.

The antioxidant is present in an amount can from 0 wt %, or greater than 0 wt %, or 0.01 wt %, or 0.02 wt %, or 0.03 wt %, or 0.04 wt %, or 0.05 wt %, or 0.05 wt %, or 0.07 wt %, or 0.08 wt %, or 0.09 wt %, or 0.1 wt % to 0.12 wt %, or 0.14 wt %, or 0.15 wt %, or 0.18 wt %, or 0.2 wt %, or 0.25 wt %, or 0.3 wt %, or 0.5 wt %, or 1 wt %, or 2 wt %, based on the total weight of the filling composition.

Filling Composition

The present disclosure provides a filling composition comprising (A) a mineral oil having a kinematic viscosity from 32 cSt to 100 cSt at 40° C.; (B) a styrene-ethylene/propylene diblock copolymer; (C) from 1 wt % to less than 5 wt % polystyrene having a weight average molecular weight ($M_w$) from 1,000 to 100,000; and, optionally, (D) a polyolefin copolymer having a $M_w$ from 5,000 to 30,000 and (E) an antioxidant (hereafter "Filling Composition 1")

In an embodiment, Filling Composition 1 has a drop point from 195° C., 200° C., or 205° C. to 210° C., or 215° C., or 220° C.

In an embodiment, Filling Composition 1 has a low shear rate viscosity from greater than 15 Pa·s, or 20 Pa·s, or 21 Pa·s, or 22 Pa·s to 23 Pa·s, or 24 Pa·s, or 25 Pa·s, or 27 Pa·s, or 30 Pa·s, or 35 Pa·s.

In an embodiment, Filling Composition 1 has a medium shear rate viscosity from 5 Pa·s, or 5 Pa·s, or 7 Pa·s to 8 Pa·s, or 9 Pa·s, or 10 Pa·s, or 11 Pa·s, or 12 Pa·s, or 15 Pa·s.

In an embodiment, Filling Composition 1 has a high shear viscosity from 1.5 Pa·s, or 2.0 Pa·s, or 2.5 Pa·s, or 3.0 Pa·s, or 3.5 Pa·s to 4.0 Pa·s, or 4.5 Pa·s, or 5.0 Pa·s, or 5.5 Pa·s, or 5.0 Pa·s, or 5.5 Pa·s.

In an embodiment, Filling Composition 1 has a shear thinning index from 2.0, or 2.5, or 3.0, or 3.25, or 3.5, or 3.75 or 4.0, or 4.25, or 4.5, to 4.75, or 5.0, or 5.5, or 5.0, or 8.0.

Not to be bound by any particular theory, it is believed that the intermolecular styrene-styrene interaction between the polystyrene and the styrene-ethylene/propylene diblock copolymer influences the fluid performance of the present filling composition. The aromatic portions of the polystyrene and the styrene-ethylene/propylene diblock copolymer have a strong interaction, resulting in a higher drop point. The interaction between the polyolefin segments of the styrene-ethylene/propylene diblock copolymer (and between the polyolefin segments of the styrene-ethylene/propylene diblock copolymer and the polyolefin copolymer, if present) is a weaker interaction which is easily broken upon the application of shear force. The present composition therefore behaves like a fluid under shear force.

In an embodiment, Filling Composition 1 has one, some, or all of the properties:
  i) a drop point from 195° C., or 200° C., or 206° C. to 210° C., or 215° C., or 220° C.; and/or
  ii) a low shear rate viscosity from 15 Pa·s, or 20 Pa·s, or 21 Pa·s, or 22 Pa·s to 23 Pa·s, or 24 Pa·s, or 25 Pa·s, or 27 Pa·s, or 30 Pa·s, or 35 Pa·s; and/or
  iii) a medium shear rate viscosity from 5 Pa·s, or 5 Pa·s, or 7 Pa·s to 8 Pa·s, or 9 Pa·s, or 10 Pa·s, or 11 Pa·s, or 12 Pa·s, or 15 Pa·s; and/or
  iv) a high shear rate viscosity from greater than 1.5 Pa·s, or 2.0 Pa·s, or 2.5 Pa·s, or 3.0 Pa·s, or 3.5 Pa·s to 4.0 Pa·s, or 4.5 Pa·s, or 5.0 Pa·s, or 5.5 Pa·s, or 5.0 Pa·s, or 5.5 Pa·s; and/or
  v) a shear thinning index from 2.0, or 2.5, or 3.0, or 3.25, or 3.5, or 3.75 or 4.0, or 4.25, or 4.5, to 4.75, or 5.0, or 5.5, or 5.0, or 8.0.

In an embodiment, Filling Composition 1 has at least two, at least three, at least four, or all five of properties i)-v).

In an embodiment, Filling Composition 1 has one, some, or all of the properties:
  i) a drop point from 205° C. to 220° C.;
  ii) a low shear rate viscosity from 20 Pa·s to 35 Pa·s;
  iii) a medium shear rate viscosity from 5 Pa·s to 12 Pa·s;
  iv) a high shear rate viscosity from greater than 4.5 Pa·s to 5.5 Pa·s; and
  v) a shear thinning index from 2.0 to 8.0.

In an embodiment, Filling Composition 1 has at least two, at least three, at least four, or all five of properties i)-v).

Buffer Tube

The present disclosure provides a buffer tube. A "buffer tube" is a conduit, contained within an optical cable through which one or more optical fibers extend. FIG. 1 provides a cross-sectional view of an exemplary buffer tube 10 which surrounds a plurality of optical fibers 15 and is filled with a filling composition 20. In an embodiment, and as shown in FIG. 1, the filling composition 20 is in contact with a surface, specifically an inner surface 12, of the buffer tube 10. The filling composition 20, or simply composition, is according to any one or combination of two or more embodiments provided herein.

In an embodiment, the buffer tube comprises a filling composition in contact with a surface of the buffer tube, the composition comprising (A) a mineral oil having a kinematic viscosity from 32 cSt to 100 cSt at 40° C.; (B) a styrene-ethylene/propylene diblock copolymer; and (C) from 1 wt % to less than 5 wt % polystyrene having a weight average molecular weight ($M_w$) from 2,000 to 100,000, and, optionally (D) a polyolefin copolymer and (E) an antioxidant (Filling Composition 1).

The buffer tube is composed of a polymeric material. Non-limiting examples of suitable polymeric materials include olefin-based polymers, such as ethylene-based polymers and propylene-based polymers, polybutylene terephthalate, and combinations thereof. In an embodiment, the buffer tube is composed of a polyolefin material selected from polypropylene and polyethylene.

In an embodiment, the buffer tubes material is a propylene-based polyolefin material. The propylene-based polyolefin material comprises from 50 wt %, or 55 wt %, or 50 wt %, or 55 wt %, or 70 wt % or 75 wt %, or 80 wt %, or 85 wt %, or 90 wt %, or 95 wt %, or 100 wt % of a propylene-based polymer. The propylene-based polymer may be blended with at least one other polyolefin. Non-limiting examples of suitable polyolefins include other propylene-based polymers and ethylene-based polymers, including random propylene and/or ethylene-based polymers and block copolymers.

In an embodiment, the buffer tube material is a blend comprising from greater than 50 wt %, or 55 wt %, or 50 wt %, or 55 wt %, or 70 wt % to 75 wt %, or 80 wt %, or 85 wt %, or 90 wt %, or 95 wt % of a propylene-based polymer and from 5 wt %, or 10 wt %, or 15 wt %, or 20 wt %, or 25 wt %, or 30 wt %, or 35 wt %, or 40 wt %, or 45 wt %, or less than 50 wt % of an ethylene-based polymer.

In an embodiment, the buffer tube material is an ethylene-based polyolefin material. The ethylene-based polyolefin material comprises from 50 wt %, or 55 wt %, or 50 wt %, or 55 wt %, or 70 wt % to 75 wt %, or 80 wt %, or 85 wt %, or 90 wt %, or 95 wt %, or 100 wt % of an ethylene-based polymer. The ethylene-based polymer may be blended with at least one other polyolefin. Non-limiting suitable examples of other polyolefins include other ethylene-based polymers and propylene-based polymers including random ethylene and/or propylene-based polymers and block copolymers.

In an embodiment, the buffer tube material is a blend comprising from greater than 50 wt %, or 55 wt %, or 50 wt %, or 55 wt %, or 70 wt %, or 75 wt %, or 80 wt %, or 85 wt %, or 90 wt %, or 95 wt % of an ethylene-based polymer and from 5 wt %, or 10 wt %, or 15 wt %, or 20 wt %, or 25 wt %, or 30 wt % to 35 wt %, or 40 wt %, or 45 wt %, or less than 50 wt % of a propylene-based polymer.

In an embodiment, the buffer tube material is a block composite composed of (i) propylene homopolymer, (ii) an ethylene/propylene copolymer, and (iii) a block copolymer having a propylene block (PB) and an ethylene block (EB), wherein the propylene block (PB) is the same propylene homopolymer as component (i) of the block composite and the ethylene block (EB) is the same ethylene/propylene copolymer as component (ii) of the block composite.

Optical Fiber Cable

An optical fiber cable includes one or more optical fibers or other optical waveguides that conduct optical signals (e.g., for carrying sound, data, video or other information). Generally, the optical fibers are arranged in a buffer tube as described herein. FIG. 1 is a cross-sectional view of an exemplary optical fiber cable 100. FIG. 1 shows a plurality of buffer tubes 10 each surrounding a plurality of optical fibers 15 and including a filling composition 20. The buffer tubes 10 are arranged around a central strength member 30 and the buffer tubes 10 and strength member 30 are encased by a water blocking tape 40 and cable jacket 50 to form the optical fiber cable 100. In the embodiment shown, the tubular structure formed by the water blocking tape 40 and cable jacket 50 is filled with a filling composition 20 to provide protection against moisture and mechanical stress.

In an embodiment, an optical fiber cable includes one or more buffer tubes as described herein.

Some embodiments of the present disclosure will now be described in detail in the following examples.

EXAMPLES

Materials

Mineral Oil is a mineral oil having a kinematic viscosity of 100 cSt at 40° C., available as 400N mineral oil from Suzhou SAIPAHAN Special Oil Co. Ltd.

S-E/P is a clear, linear styrene-ethylene/propylene diblock copolymer with a bound styrene content of 35% based on mass, available as G1701 from Kraton Company.

PS1 is a polystyrene having a ring and ball softening point of 114-120° C., a density of 1.05 g/cc, a $M_w$ of 2030, a $M_n$ of 1150, and a $M_w/M_n$ of 1.8, available as Kristalex.

PS2 is a polystyrene having a ring and ball softening point of 159° C., a $M_w$ of 8500, a $M_n$ of 2500, and a $M_w/M_n$ of 3.5, available as Endex 150.

PS3 is a polystyrene having a ring and ball softening point of 125° C., a density of 1.05 g/cc, a $M_w$ of 37,400, a $M_n$ of 1300, and a $M_w/M_n$ of 28.5, available as Piccolastic D125.

Sample Preparation

Compositions of (A) mineral oil, (B) S-E/P, and (C) PS1, PS2 or PS3 are formed by putting the components (A)-(C), in accordance with the amounts provided in Table 1, into a Parr Reactor steel vessel. The vessel is installed in Parr Reactor while water pipe and pressure release valves are shut off. The mixer is started at 100-200 rpm while the heater begins to heat the vessel from room temperature to 150° C. The mixer is set to maximum speed (800 rpm) when the temperature reaches 150° C. After 1.5 hours of mixing at maximum speed, the heater is shut off. The vessel is released when the temperature hits 100° C. The fluid is transferred from the steel vessel to a glass bottle for performance evaluation.

TABLE 1

|  | Component | CS1 | CS2 | CS3 | CS4 | CS5 | CS6 | IE1 | IE2 | IE3 | IE4 | IE5 | IE6 |
|---|---|---|---|---|---|---|---|---|---|---|---|---|---|
| Component (wt %) | Mineral Oil | 95 | 92.5 | 90 | 90 | 90 | 90 | 90 | 90 | 90 | 90 | 90 | 90 |
|  | S-E/P | 5 | 7.5 | 10 | 5 | 5 | 5 | 80 | 7.5 | 7 | 6 | 7.5 | 7.5 |
|  | PS1 |  |  |  |  |  | 5 | 2 | 2.5 | 3 | 4 |  |  |
|  | PS2 |  |  |  |  | 5 |  |  |  |  |  |  | 2.5 |
|  | PS3 |  |  |  | 5 |  |  |  |  |  |  | 2.5 |  |
|  | Total (wt %) | 100 | 100 | 100 | 100 | 100 | 100 | 100 | 100 | 100 | 100 | 100 | 100 |
|  | Drop Point (° C.) | 77.8 | 195.3 | 205.8 | 50 | 150.9 | 182 | 219.4 | 213.5 | 206.9 | 195 | 210 | 208.5 |
| Viscosity (Pas) | Low shear rate (5 s$^{-1}$) | 4.8 | 24.6 | 60.8 | 11.5 | 12.9 | 14.1 | 30.6 | 31.4 | 22.7 | 17.3 | 28.9 | 30.5 |
|  | Medium shear rate (50 s$^{-1}$) | 3.1 | 9.5 | 20.7 | 4.6 | 4.9 | 5.4 | 10.5 | 11.4 | 7.6 | 6.2 | 10.4 | 11.1 |
|  | High shear rate (200 s$^{-1}$) | 2.1 | 5.4 | 9.7 | 3 | 3.2 | 3.3 | 5.7 | 6.1 | 4.4 | 3.6 | 5.8 | 6.1 |
|  | Shear Thinning | 2.3 | 4.6 | 6.3 | 3.8 | 4.0 | 4.3 | 5.4 | 5.1 | 5.2 | 4.8 | 5.0 | 5.0 |

CS = comparative sample
IE = inventive example

CS1, CS2 and CS3 each is a two-component composition composed of mineral oil as a majority component and a varying amount of the styrene-ethylene/propylene diblock copolymer as described in Table 1. CS1, CS2 and CS3 show that increasing the amount of styrene-ethylene/propylene diblock copolymer in the mineral oil increases the drop point but also increases the viscosities and shear thinning value.

CS4, CS5 and CS6 each is a three-component composition, each including a majority amount mineral oil, 5 wt % of the styrene-ethylene/propylene diblock copolymer and 5 wt % of polystyrene with varying values for weight average molecular weight ($M_w$). The drop point for each of CS4, CS5 and CS6 is below 195° C. despite the inclusion of the polystyrene.

When IE1-IE4 are compared to CS1-CS3, it is shown that replacing an amount of the styrene-ethylene/propylene diblock copolymer with the polystyrene having a $M_w$ of 1,000 to 100,000 improves both the drop point and viscosity performance. Particularly, IE1-IE4 each have a drop point of 195° C. or greater in combination with (i) a low shear rate viscosity from 15 Pa-sec to 35 Pa-sec, (ii) a high shear rate viscosity from 1.5 Pa-sec to 5.5, and (iii) a shear thinning index from 2.0 to 8.0. For IE1-IE4, each includes the same polystyrene in increasing amounts from 2 wt % to 4 wt % (less than 5 wt %).

Moreover, IE1-IE4 each has a drop point greater than or equal to 195° C. and improved viscosity performance as compared to CS5, which also uses the same polystyrene, as in IE1-IE4, but the polystyrene of CS5 is present in an amount of 5 wt %. As shown by a comparison of IE1-IE6 to CS4-CS5, once the amount of polystyrene reaches 5 wt %, the drop point drops below 195° C. A comparison of CS4 and CS5 to IE5 and IE5, respectively, illustrates that when the amount of polystyrene is less than 5 wt %, the drop point and viscosity performance are improved compared to identical composition having a polystyrene content of 5 wt % even when the $M_w$ of the polystyrene is higher (above 200,000).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A filling composition comprising:
   (A) a mineral oil having a kinematic viscosity from 32 cSt to 100 cSt at 40° C.;
   (B) a styrene-ethylene/propylene diblock copolymer; and
   (C) from 1 wt % to less than 5 wt % polystyrene having a weight average molecular weight (Mw) of from 1,000 to 100,000.

2. The filling composition of claim 1 comprising:
   (A) from 70 wt % to 90 wt % of the mineral oil;
   (B) from greater than 5 wt % to 9 wt % of the styrene-ethylene/propylene diblock copolymer; and
   (C) from 1 wt % to less than 5 wt % of the polystyrene.

3. The filling composition of claim 2 wherein the polystyrene has a weight average molecular weight ($M_w$) from 1,000 to 50,000.

4. The filling composition of claim 3 having a drop point from 195° C. to 220° C.

5. The filling composition of claim 4 having a low shear viscosity from 15 Pa-s to 30 Pa-s.

6. The filling composition of claim 5 having a shear thinning index from 2.0 to 8.0.

7. The filling composition of claim 1, further comprising a propylene/ethylene copolymer having a weight average molecular weight (Mw) from 5,000 to 300,000.

8. The filling composition of claim 7, wherein the filling composition comprises from 1 wt % to less than or equal to 2.5 wt % of the polystyrene.

9. The filling composition of claim 8 further comprising an antioxidant.

10. A buffer tube comprising:
   a filling composition in contact with a surface of the buffer tube, the composition filling comprising (A) a mineral oil having a kinematic viscosity from 32 cSt to 100 cSt at 40° C.;
   (B) a styrene-ethylene/propylene diblock copolymer; and
   (C) from 1 wt % to less than 5 wt % polystyrene having a weight average molecular weight (Mw) of from 1,000 to 100,000.

* * * * *